United States Patent [19]
Petersen

[11] Patent Number: 5,456,640
[45] Date of Patent: Oct. 10, 1995

[54] AUTOMATIC TRANSMISSION WITH TORQUE-DIVIDING GEARING

[76] Inventor: Dean B. Petersen, 2831 W. 11400 S., South Jordan, Utah 84095

[21] Appl. No.: 194,046

[22] Filed: Feb. 9, 1994

[51] Int. Cl.⁶ .............................. F16H 1/30; F16H 37/06
[52] U.S. Cl. ............................................. 475/330; 475/336
[58] Field of Search ................................... 475/331, 336, 475/329, 330

[56] References Cited

U.S. PATENT DOCUMENTS

| | | |
|---|---|---|
| 3,429,200 | 2/1969 | Green . |
| 4,235,125 | 11/1980 | Perlin . |
| 4,625,588 | 12/1986 | Brickley . |
| 4,813,298 | 3/1989 | Kurtossy ................................ 475/330 |
| 4,854,190 | 8/1989 | Won . |
| 5,106,353 | 4/1992 | Ra et al. . |
| 5,171,194 | 12/1992 | Shen ..................................... 475/330 |
| 5,226,859 | 7/1993 | Pires ................................... 475/330 X |

FOREIGN PATENT DOCUMENTS

| | | | |
|---|---|---|---|
| 710145 | 9/1941 | Germany .............................. 475/329 |
| 2222642A | 3/1990 | United Kingdom ................... 475/330 |

Primary Examiner—Rodney H. Bonck
Assistant Examiner—Nathan O. Jensen
Attorney, Agent, or Firm—Thorpe, North & Western

[57] ABSTRACT

An automatic transmission having an input annulus and a first bevel gear integrally attached to an input shaft to thereby divide torque in the input shaft into two torque components. A sun gear is rotatably mounted about the input shaft, and a set of planetary gears are in simultaneous meshing engagement (i) about the sun gear and (ii) with interior teeth of the input annulus. The sun gear includes a second bevel gear fixedly attached to a side of said sun gear and in substantial co-axial orientation with the sun gear and the first bevel gear. At least one torque-varying gear member comprises a torque-combining bevel gear and a torque-delivering gear integrally intercoupled by a stub shaft. The torque-combining bevel gear is in simultaneous meshing engagement with the first and second bevel gears, and the torque-delivering gear is in meshing engagement with an output gear, said output gear being integrally attached to an output shaft. This gear design is automatically driven by varying loads on the output shaft, such that a least a portion of the torque in the input shaft is gradually and variably divided between the first and second torque components.

20 Claims, 1 Drawing Sheet

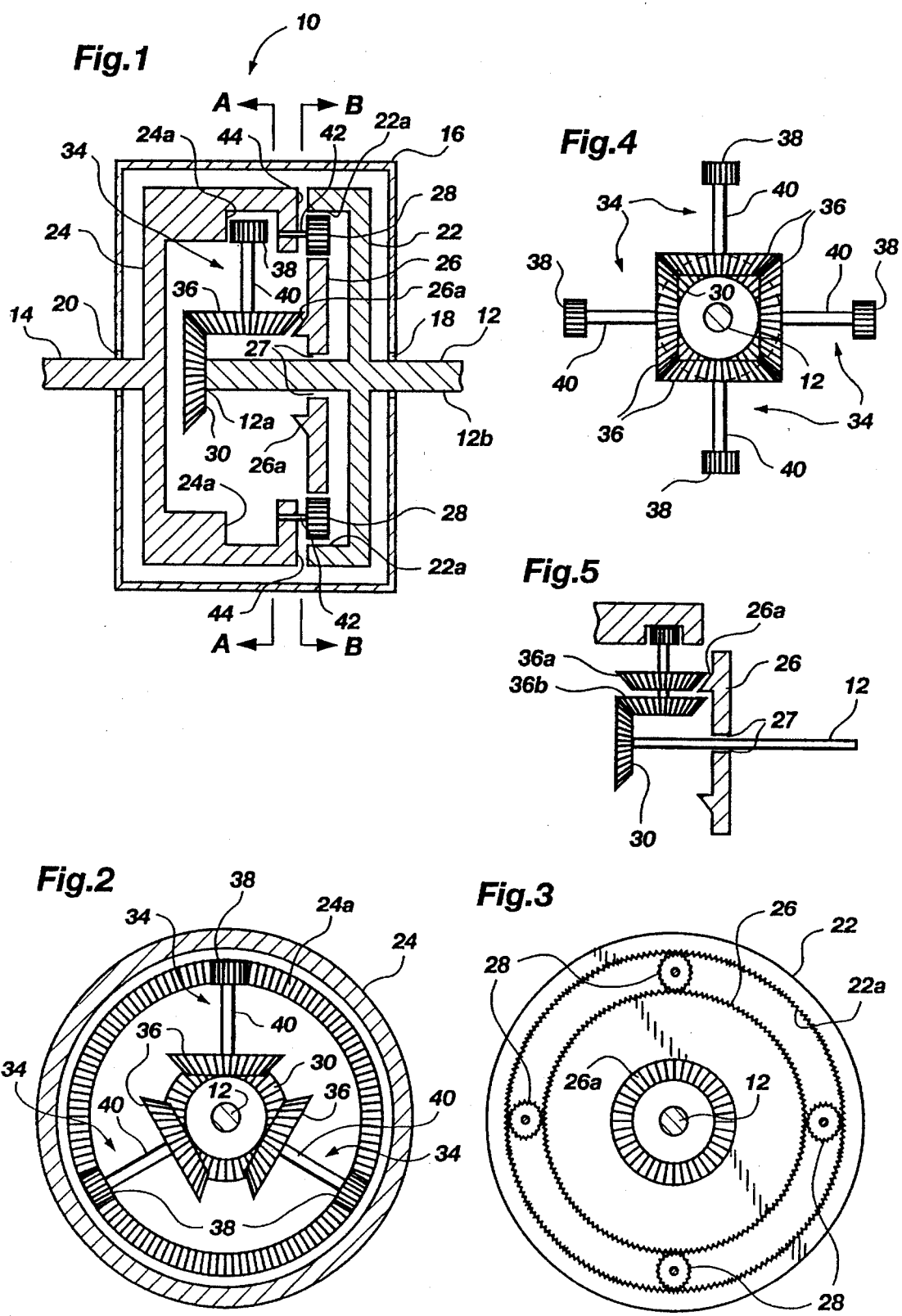

AUTOMATIC TRANSMISSION WITH TORQUE-DIVIDING GEARING

BACKGROUND OF THE INVENTION

1. The Field of the Invention

The present invention relates generally to continuously varying automatic transmissions in vehicles. More particularly, it concerns a vehicle transmission system which continuously and variably divides input torque between at least two torque paths to thereby maintain an optimal gear ratio, without the aid of brakes, clutches, belts, external motors or any other secondary input force.

2. The Background Art

Transmission devices are well known in the field of motorized vehicles for converting and transmitting the power generated by an engine to an output shaft. It is known to make efficient use of the motor power by adjusting the gear ratio between the input and output shafts responsive to variation in loads on the output shaft and/or the input shaft. For example, a higher gear ratio often provides a more efficient transfer of power for larger loads on the output shaft. Conversely, a lower gear ratio often suffices for lesser loads on the output shaft.

The need to optimize the motor power by varying the gear ratio has motivated the development of many different transmission devices capable of shifting between gear ratios. The standard transmission is known in the field to permit an operator to shift between various gear ratios by operating a hand-shift lever in conjunction with a foot clutch. Automatic transmissions have been developed which accomplish an automatic shifting between gear ratios responsive to increases and decreases in load on the output shaft.

Another approach to vehicle transmissions is the concept of a continuously variable transmission, which automakers have attempted for years to develop. It is thought that energy transfer between the motor and the output shaft can be further optimized by providing an infinite range of gear ratios between the minimum and maximum gear ratios, instead of merely four or five different gear ratios. This idea is a good one, since variation in load on the output shaft tends to increase/decrease gradually and continuously. Indeed, it stands to reason that provision of an optimal gear ratio for each and every load variation on the output shaft would maximize the efficiency of the vehicle. However, there have been many practical difficulties with the prior art transmission devices which offer continuously variable gear ratios.

For example, U.S. Pat. Nos. 5,106,353 (issued on Apr. 21, 1992 to Ra et al.) 4,625,588 (issued on Dec. 2, 1986 to Brickley), and 3,429,200 (issued on Feb. 25, 1969 to Green) disclose continuously varying transmission devices. These and other prior art continuously varying transmission devices known to applicant are characterized by a number of disadvantages. They require a brake, clutch, torque convertor or some other secondary input force necessary to permit continuous variation between gear ratios. They also require a large number of gears and support components, and are therefore cumbersome in manufacture, maintenance and operation.

The above-mentioned prior art variable-ratio transmission devices typically involve two differential gear sets which divide the input torque into two torque components. The two torque components are eventually linked back together to produce a resultant output torque. The variation in gear ratio is accomplished by either (i) restricting a key gear member to unidirectional rotation to force a particular proportional division of torque between the two torque components, or (ii) accelerating or decelerating a key gear member with a clutch or brake to force the input torque to be gradually divided between the two torque components. The division of the input torque between the two separate differential gear sets results in a continuous variation in the overall gear ratio. However, the secondary input force required to effectuate variation in gear ratio, whether in the form of a brake, clutch, torque convertor or other input force, necessarily results in significant power loss. It is ironic that significant power loss is required for operation of these prior art continuously variable transmissions, when the purpose of continuous gear-ratio variation is to conserve and optimize power output.

There is thus a need for an automatic, continuously variable transmission which is simple in design, manufacture and operation. There is a further need for such a transmission which does not require the aid of brakes, clutches, torque convertors, belts, external motors or any other secondary input force, to accomplish continuous variation between an infinite range of gear ratios.

OBJECTS AND SUMMARY OF THE INVENTION

It is therefore an object of the present invention to provide an automatic, variable-ratio transmission which is simple in design, manufacture and operation.

It is an another object of the invention to provide such a transmission which maintains an optimal gear ratio for a range of varying load proportions between an input shaft and an output shaft.

It is an additional object of the invention to provide such a transmission which makes more efficient use of the power output of a motor.

It is a further object of the invention to provide such a transmission which does not lose significant power during adjustment/variation of the gear ratio.

It is another object of the invention to provide such a transmission which includes torque-dividing gears fixedly mounted on the input shaft to thereby divide the input torque into at least two torque components, and which transfers said two torque components only between gears which are in meshing engagement.

It is still another object of the invention to provide such a transmission which does not require the aid of brakes, clutches, torque convertors, belts, external motors or any other secondary input force, to accomplish continuous variation between an infinite range of gear ratios.

It is yet another object of the invention, in accordance with one aspect thereof, to provide such a transmission which requires relatively few gears.

The above objects and others not specifically recited are realized in an illustrative embodiment of an automatic transmission having continuously variable gear ratios. An input annulus and a first bevel gear are configured for integral attachment to an input shaft to thereby divide torque in the input shaft into two separate torque components of force. A sun gear is rotatably mounted about the input shaft, and a set of planetary gears are in simultaneous meshing engagement (i) about the sun gear and (ii) with interior teeth of the input annulus. The sun gear includes a second bevel gear fixedly attached to a side of said sun gear and in substantial co-axial orientation with the sun gear and the first bevel gear. At least one torque-varying gear member comprises a torque-combining bevel gear and a torque-delivering gear integrally intercoupled by a stub shaft. The torque-combining bevel gear is in simultaneous meshing engagement with the first and second bevel gears, and the torque-delivering gear is in meshing engagement with an output gear, said output gear being configured for integral attachment to output shaft means. This gear design is automatically driven by varying loads on the output shaft, such that a least a portion of the torque in the input shaft is gradually and variably divided between the first and second torque components. This gradual and variably load-driven division of input torque enables continuous variation of gear ratios between the input shaft and the output shaft.

Additional objects and advantages of the invention will be set forth in the description which follows, and in part will be apparent from the description, or may be learned by the practice of the invention. The objects and advantages of the invention may be realized and obtained by means of the instruments and combinations particularly pointed out in the appended claims.

BRIEF DESCRIPTION OF THE DRAWINGS

The above and other objects, features and advantages of the invention will become apparent from a consideration of the subsequent detailed description presented in connection with the accompanying drawings in which:

FIG. 1 illustrates a side, cross sectional view of an automatic, variable-ratio transmission made in accordance with the principles of the present invention;

FIG. 2 illustrates a cross sectional view of the transmission of FIG. 1, taken along section A—A;

FIG. 3 illustrates another cross sectional view of the transmission of FIG. 1, taken along section B—B;

FIG. 4 illustrates an alternative embodiment of the transmission of FIG. 2; and

FIG 5 illustrates another alternative embodiment of the transmission of FIG. 2.

DETAILED DESCRIPTION OF PRESENTLY PREFERRED EMBODIMENTS

Reference will now be made to the drawings wherein like structures will be provided with like reference numerals.

FIG. 1 illustrates the features of an automatic variable-ratio transmission, generally designated at 10, made in accordance with the present invention. The transmission 10 includes an input annulus 22 integrally attached to an input shaft 12, and an output annulus 24 integrally attached to an output shaft 14. The input annulus 22 can be described as a first torque-dividing gear, as more fully explained below (the terms "input annulus 22" and "first torque-dividing gear 22" are used interchangeably herein to refer to a gear member configured for integral attachment to an input shaft 12). The input shaft 12 and the output shaft 14 are rotatably mounted in a transmission housing 16, at bearing connections 18 and 20, respectively.

A sun gear 26 circumscribes the input shaft 12 in substantial co-axial orientation therewith, such that interior teeth 22a of the input annulus 22 reside in concentrically spaced orientation about the sun gear 26. At least one planetary gear 28 is in simultaneous meshing engagement (i) about the sun gear 26, and (ii) with the interior teeth 22a of the input annulus 22, as shown in FIGS. 1 and 3. It is preferred that the sun gear 26 be mounted upon the input shaft 12 with a bearing-type connection 27, although said sun gear 26 may instead be held in position solely by a plurality of the planetary gears 28. The sun gear 26 includes sun gear side teeth 26a, which are preferably bevel teeth. The sun gear side teeth 26a can be described as a first final torque-transfer gear which is fixedly attached to the sun gear 26 and in substantial co-axial orientation with the sun gear 26 and the input shaft 12 (the terms "sun gear side teeth 26a" and "first final torque transfer gear 26a" are used interchangeably herein to indicate a separate gear member integrally attached to the sun gear 26). The planetary gears 28, the sun gear 26, and the sun gear side teeth 26a can be described collectively as a torque-transferring gear set, which refers to the fact that a first torque component is transferred from the input annulus 22 through the planetary gears 28, the sun gear 26 and into the sun gear side teeth 26a.

A second torque-dividing gear 30, preferably a bevel gear, is integrally attached to a distal end 12a of the input shaft 12 so as to be in substantial co-axial orientation with the input shaft 12, the sun gear 26 and the sun gear side teeth 26a. The second torque-dividing gear 30 is thus confined to rotation with the input annulus 22 when the input shaft 12 is rotated, since both the second torque-dividing gear 30 and the input annulus 22 are integrally attached to the input shaft 12. For this reason, the input annulus/first torque-dividing gear 22 and the second torque-dividing gear 30 operate to divide torque from the input shaft 12 into two separate torque components, as more fully discussed below.

At least one dual-gear member, designated generally at 34, includes a torque-combining gear 36 and a torque-delivering gear 38 integrally intercoupled by a stub shaft 40. The torque-combining gear 36 is preferably a bevel gear as shown, and is in simultaneous meshing engagement with the second torque-dividing gear 30 and the sun gear side teeth 26a. The torque-combining gear 36 thus operates to simultaneously receive first and second torque components from the sun gear side teeth 26a and the second torque-dividing gear 30, respectively, and further operates to combine said first and second torque components into a single torque component.

The torque-delivering gear 38 is in meshing engagement with interior teeth 24a of the output annulus 24. Since the torque-combining gear 36 and the torque-delivering gear 38 are both integrally attached to the stub shaft 40, the torque-delivering gear 38 operates to deliver the combined single torque component to the output annulus 24 as shown in FIG. 1. The interior teeth 24a of the output annulus 24 are preferably in substantially transverse orientation relative to the interior teeth 22a of the input annulus 22, such that axes of rotation of torque-delivering gears 38 of the dual-gear members 34 are in substantial perpendicular orientation with axes of rotation of the planetary gears 28, as shown in FIG. 1.

It is noted that each planetary gear 28 is rotatably mounted upon a carrier arm 42 which is fixedly attached to an outer rim 44 of the output annulus 24, to thereby transfer a third torque component from the planetary gears 28 to the output annulus 24. It is to be understood that all of the gears of the transmission 10 operation in cooperation, and the third torque component is thus an interactive by-product of the torque carried by the dual gear members 34, a portion of which is passed as a torque division between the torque-combining gears 36 and the sun gear side teeth 26a. The connection between the planetary gears 28 and the carrier arms 42 is thus a bearing-type connection, while the connection between the first and second torque-dividing gears 22 and 30 and the input shaft 12 is a fixed-type, integral connection. Therefore, first and second torque components which are simultaneously transferred through the sun gear side teeth 26a and the second torque-dividing gear 30, respectively, onto the torque-combining gear 36 are transferred only between gears in meshing engagement. However, the third torque component, which passes from the planetary gears 28 through the carrier arms 42 and into the output annulus 24, is not transferred only through gears in meshing engagement, because this third torque component passes through the bearing-type connection between the planetary gears 28 and the carrier arms 42. The significance of this will be explained below.

In operation, an input torque is received on the input shaft 12, and is instantaneously divided between at least the input annulus and the second torque-dividing gear 22 and 30, respectively. As noted above, a first torque component acts through a first gear set, namely, the input annulus 22, planetary gears 28, sun gear 26, and sun gear side teeth 26a to arrive on a first side of each torque-combining gear 36. A second torque component acts through a second gear set of simply the second torque-dividing gear 30 to arrive on a second side of each torque-combining gear 36. Again, all torque transfer and inter-gear engagements are interactive with each other and cooperative in nature. It is noted, however, that either of the respective first and second gear sets can be designed to correspond to a desired response for the overall optimal gear ratio. The first gear set (i.e. 28, 26 and 26a) preferably corresponds to the higher overall gear ratios, in that the sun gear 26 spins at a higher angular velocity for the higher overall gear ratios of the transmission 10. Accordingly, most of the input torque is transferred through this first gear set during initial periods of acceleration. As the load on the output shaft decreases (for example, as the vehicle approaches a desired velocity), the transmission 10 automatically adapts to transfer less of the input torque through rotational gear transfer and more through gear contact, i.e., the internal gears 28, 26, and 34 gradually rotate less and less but orbit more and more. Eventually a 1:1 gear ratio is achieved, at which point none of the gears 28 are spinning about their axes of rotation but are held fixed relative to each other and to the sungear 26, and the respective input and output shafts 12 and 14 operate like a single, solid shaft.

It will be appreciated that the greater the relative angular velocity between the input and output shafts 12 and 14, the more the internal gears 28, 26 and 34 are caused to rotate about their axes of rotation. Conversely, the less the relative angular velocity between the input and output shafts 12 and 14, the less the gears 28 and 34 rotate and the more they orbit about an axis of the input shaft 12. Put another way, the gears of the transmission 10 are directly, mechanically responsive to the proportion of angular velocities between the input shaft 12 and the output shaft 14. As the load on the output shaft 14 decreases, the rotation of the gears decelerates and the planetary gears 28 and the dual gear members 34 go into an orbit about the input shaft 12 until a 1:1 gear ratio is achieved, at which point the gears 28 and 34 only orbit and are fixed relative to the second torque-dividing gear 30 and the sun gear 26.

The gear ratio is thus determined by the dual-gear members 34 in cooperation with the surrounding gears, and is set by the relative velocities of the input and output shafts 12 and 14. The higher the gear ratio needed, the more the dual gear members 34 will spin. The lower the gear ratio needed, the less the dual gear members 34 will spin and the more they will orbit. The dual gear members 34 are the link connecting both of the first and second torque components, and operate to determine the overall gear ratio. The gear ratio is thus at a 1:1 ratio when the dual gear members 34 are only orbiting and not spinning.

As the load on the output shaft 14 decreases for whatever reason, torque is gradually and variably divided between the first and second torque components to thereby enable continuous varying proportion in angular velocity between the input shaft 12 and the output shaft 14. The torque is also gradually and variably divided from the third torque component (which acts from the planetary gears 28 through the carrier arms 42) in cooperation with the first and second torque components. The resultant, overall gear ratio of the transmission 10 thus depends on the amount of contribution from each gear set as discussed above. During heavy engine loading (for example, vehicle start conditions or climbing conditions), much of the power output is transmitted through the first gear set (i.e. gears 28, 26, and 26a) and the second torque-dividing gear 30. More of the input power is transferred though other torque paths as soon as there is a decrease in the load applied to the output shaft 14. The contribution of the planetary gears 28 and the carrier arms 42 then gradually increases, thereby resulting in a decrease in the resultant, overall gear ratio.

It will be thus appreciated that the second torquedividing gear 30 can also be described as a second final torque-transfer gear (the terms "second torque-dividing gear 30" and "second final torque-transfer gear 30" are used interchangeably herein to refer to a gear member configured for integral attachment to an input shaft 12 in substantial co-axial orientation with the sun gear side teeth 26a).

The variation of the overall gear ratio of the transmission 10 is continuous and automatically variable, and differs from presently known systems by the absence of internal brakes, clutches, belts, external motors or any other secondary input force. An infinite range of gear ratios are thereby available without the inefficiencies introduced by such internal input forces.

There are preferably four planetary gears 28, as shown most clearly in FIG. 3. The planetary gears 28 are preferably of substantially equal radii and substantially evenly spaced around the sun gear 26 such that each planetary gear 28 is separated from its adjacent planetary gears by approximately one-quarter arc length of the sun gear 26. There are preferably three dual-gear members 40, as shown most clearly in FIG. 2. Each of the torque-combining gears 36 of the three dual-gear members 40 are in simultaneous meshing engagement with the first and second final torque-transfer gears 26a and 30, respectively. An axis of rotation of each torque-combining combining gear 36 is thereby in substantial perpendicular orientation with substantial co-axial axes of rotation of said first and second final torque-transfer gears 26a and 30. It is preferred that the torque-combining gears 36 substantially evenly spaced about said first and second final torque-transfer gears 26a and 30, such that each torque-combining gear is separated from its adjacent torque-combining gears by approximately one-third arc length of the first and second final torque-transfer gears 26a and 30. It is further preferred that all gear members be in substantial co-axial orientation with their respective axes of rotation.

Although three dual gear members 34 are preferred, it is within the scope of the present invention to have any number of dual gear members, such as the four dual gear members 34 shown in FIG. 4. The embodiment of FIG. 4 illustrates four torque-combining gears 36 which are configured and sized such that each said torque-combining gear 36 not only meshes simultaneously with the first and second final torque-transfer gears 26a and 30, but also with its two adjacent torque-combining gears. When four dual gear members 34 are used, whether configured to mesh with each other as in FIG. 4 or not, it is preferred that they be evenly spaced about the first and second final torque-transfer gears 26a and 30. Each torque-combining gear 36 is thereby separated from its adjacent torque-combining gears by approximately one-quarter arc length of the first and second final torque-transfer gears.

It is to be understood that although the first and second final torque-transfer gears 26a and 30, and the torque-combining gear 36, are preferably bevel gears, these gear members may alternatively comprise any other gear shape or structure capable of enabling torque transfer from the gears 26a and 30 onto the torque-combining gear 36. For example, standard straight-teeth gears could be used, or even friction gears.

There are many possible configurations of the invention, and many additional environments in which the invention can be used. For example, the second torque-dividing gear/second final torque transfer gear 30 could be positioned along the input shaft 12 further away from the torque-combining gear 36. One or more gears could be used to transfer torque from the second torque-dividing gear 30 to the torque-combining gear 36, and the second torque component would thus act through more gears before reaching said torque-combining gear 36. This concept is generally applicable to any of the inter-gear torque transfers, and is within the scope of the present invention.

It is to be understood that the combinations discussed herein in conjunction with FIGS. 1–4 can be manufactured in any suitable manner, using any apparatus and support structure suitable to render operative the embodiments described herein. For example, a designer will likely wish to intercouple the stub shafts 40 of all dual gear members 34 by a connecting ring (not shown) having rotatable, bearing-type connections with said stub shafts 40 to thereby maintain contact between the torque-delivering gears 38 and the interior teeth 24a of the output annulus 24. A user may wish to apply a clutch or a torque convertor to a proximal end 12b of the input shaft 12 to enable an operator to selectively disengage the transmission 10 from the vehicle motor. This is, of course, entirely different from the internal clutches and brakes necessary to render operative the prior art variable-ratio transmissions, and it is to be understood that any such clutch, torque convertor etc. is optional and unnecessary to render operative the transmission 10 in accordance with the present invention.

A significant aspect of the present invention subsists in the dual gear members 34, and in the exclusive transfer of torque between meshing gears originating with gear members integral with the input shaft 12. The first and second final torque-transfer gears 26a and 30 both act upon the torque-combining gear 36 of each dual gear member to thereby turn each dual gear member 34 in one direction, as one would roll a pencil between flattened palms. It is, however, within the scope of the present invention to transfer two or more torque components onto first and second sides of a torque-combining gear 36 of a dual gear member 34 by any means, and thus not necessarily only through meshing gears as shown in FIG. 1. It will be appreciated that since the first and second torque components are transferred exclusively between meshing gears originating with the input annulus 22 and the second torque-dividing gear 30 (and thus not through any bearing-type connections or other means), no unidirectional clutch, brake, torque convertor or the like is necessary to force continuous variation between gear ratios as in the prior art continuously variable transmissions.

Referring now to FIG. 5, it is to be understood that the dual gear members 34 may be made in a number of different embodiments, as can any of the gear arrangements. For example, the torque-combining gear 36 of FIGS. 1–2 may instead be two separate gears 36a and 36b as in FIG. 5. In this embodiment, the gear 36b meshes only with the second torque-dividing gear 30, while the gear 36a meshes only with the sun gear side teeth 26a. It will be appreciated that the result of the embodiment of FIG. 5 is substantially the same as that of FIG. 1, in that torque components from the gears 30 and 26a are combined in the dual gear member 34. The aspect shown in FIG. 4 of meshing engagement between adjacent pairs of gears 36 could also be applied with respect to pairs of adjacent gears 36a, and/or 36b. It will thus be appreciated that numerous modifications of the gear configurations of FIGS. 1–5 are possible and still within the scope of the present invention.

Those having skill in the field of mechanical transmissions will appreciate many advantages of the transmission 10 and equivalents thereof. By constantly and continuously maintaining an optimal gear ratio based upon the proportion of respective loads on the input and output shafts 12 and 14, the transmission 10 prevents undue stress on the motor and thereby improves the life of the motor and the vehicle. The transmission 10 is also much more efficient because no power is wasted in order to accelerate the vehicle or to shift between gear ratios, since the overall gear ratio is constantly and continuously changing to be compatible with the load proportion between the input and output shafts 12 and 14. This is especially important for applications involving AC motors as known in the art, in that it is of critical importance to the performance and life of such AC motors that angular velocity of the power transfer shaft/component thereof not deviate beyond the bounds of the designed angular velocity range. Further, these advantages are brought about by a transmission 10 having exceptionally few gears, and is thereby less expensive and time-consuming to design, manufacture and operate.

While the present invention has been described in terms of a vehicle transmission, it is to be understood that the present invention may also be useful in any application requiring continuously variable-ratio power transmission. The principles of the invention may thus be used in any setting requiring the advantages thereof. Those having ordinary skill in the field of this invention will appreciate the advantages of the invention, and its application to a wide variety of uses. For example, the transmission 10 could be used to transmit power to the operative components in heavy equipment, such as a loader or other machinery. As the loader digs into an embankment for example, the load on an output component is thereby increased, causing the transmission to automatically and continuously adjust responsive to the load increase in the manner discussed above, such that the motor power is transmitted to the loader at an optimal gear ratio. The transmission amazingly adapts to loads instantaneously, such that power is perfectly conserved and transmitted at a gear ratio which is actually determined by the load, consistent with the discussions above.

The present invention represents a significant advance in the field of continuously variable transmissions. It is noted that many of the advantages of the present invention accrue due to the fact that input torque is divided between at least two separate gear sets into two separate torque components. This torque division occurs between two separate gear members which are integral with the input shaft 12, and the resulting torque components act only through meshing gears. Because these torque components are passed from gears integral with the input shaft 12 and only through meshing gears thereafter (i.e. not through any bearing-type connection), no unidirectional clutch, brake, torque-convertor, belt system, etc. is necessary to effectuate variation in gear ratio. It will thus be appreciated that any torque division operates to urge the gears in the positive direction instead of working against them. In other words, because the input torque is divided into two separate gears acting upon first and second sides of a torque-combining gear 36, such that said two separate gears both operate to turn said gear 36 in the same direction, any transfer of torque within the transmission 10 operates in cooperation with all other gears and not against them. The dual gear members 34 thus enable torque division which maintains an optimal gear ratio for a range of varying load proportions between an input shaft and an output shaft. The combination of spin versus orbit of the gears is thus responsive to the load on the output shaft 14 through the dual gear members 34, to thereby optimize the transfer of power from the engine at an optimal gear ratio. Those skilled in the art will appreciate from the preceding disclosure that the objectives stated above are advantageously achieved by the present invention.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. An automatic transmission for transferring torque from input shaft means to load-varying output shaft means, said transmission comprising:

torque-dividing gear means including first and second torque-dividing gears configured for integral attachment to input shaft means, and first and second final torque-transferring gears disposed in meshing engagement with torque-combining gear means, said torque-dividing gear means for (i) dividing torque from said input shaft means into first and second torque components of force, respectively, and (ii) transferring at least portions of said first and second torque components into said first and second final torque-transferring gears, respectively;

at least one dual-gear member having said torque-combining gear means and a torque-delivering gear integrally intercoupled by a shaft, said torque-combining gear means being in simultaneous meshing engagement with the first and second final torque-transferring gears to thereby combine at least portions of the first and second torque components into a single torque component of force, and an output gear disposed in meshing engagement with said torque-delivering gear and being configured for integral attachment to output shaft means to thereby deliver said single torque component to said output shaft means.

2. A transmission as defined in claim 1 wherein the second torque-dividing gear and the second final torque-transferring gear comprise one and the same gear member.

3. A transmission as defined in claim 1 wherein the input shaft means comprises a rigid, elongate input shaft, and wherein said at least portions of the first and second torque components are transferred only between gears in meshing engagement.

4. A transmission as defined in claim 3 wherein the first torque-dividing gear comprises an input annulus having interior teeth and being integrally mounted upon the input shaft, and wherein the second torque-dividing gear comprises a second final torque-transferring gear which is integrally mounted upon said input shaft in substantial co-axial orientation with the first torque-dividing gear, the torque-dividing gear means further comprising:

a sun gear rotatably mounted about the input shaft in substantial co-axial orientation therewith such that the interior teeth of the input annulus reside in concentrically spaced orientation about the sun gear;

at least one planetary gear in simultaneous meshing engagement (i) about the sun gear, and (ii) with the interior teeth of the input annulus;

a first final torque-transferring gear comprising a gear fixedly attached to a side of the sun gear, said first final torque-transferring gear being in substantial co-axial orientation with the sun gear, the input shaft, and the second final torque-transferring gear.

5. A transmission as defined in claim 4 wherein the output gear comprises an output annulus having interior teeth, and wherein said at least one planetary gear is rotatably mounted upon a carrier arm which is fixedly attached to an outer rim of the output annulus, to thereby transfer a third torque component from said at least one planetary gear to the output annulus.

6. A transmission as defined in claim 4 wherein said at least one planetary gear comprises four planetary gears having substantially equal radii and being substantially evenly spaced around the sun gear such that each planetary gear is separated from its adjacent planetary gears by approximately one-quarter arc length of the sun gear.

7. A transmission as defined in claim 4 wherein the output gear comprises an output annulus having interior teeth and wherein the at least one dual-gear member comprises three dual-gear members, each of the torque-combining gear means of the three dual-gear members comprising a single gear member and being in simultaneous meshing engagement with the first and second final torque-transferring gears such that an axis of rotation of said each torque-combining gear member is in substantial perpendicular orientation with substantial co-axial axes of rotation of said first and second final torque-transferring gears, said torque-combining gear members being substantially evenly spaced about said first and second final torque-transferring gears such that each torque-combining gear member is separated from its adjacent torque-combining gear members by approximately one-third arc length of the first and second final torque-transferring gears.

8. A transmission as defined in claim 7 wherein the first and second final torque-transferring gears and the three torque-combining gear members comprise bevel gears.

9. A transmission as defined in claim 4 wherein the output gear comprises an output annulus having interior teeth and wherein the at least one dual-gear member comprises four dual-gear members, each of the torque-combining gears of the four dual-gear members comprising a single gear member and being in simultaneous meshing engagement with the first and second final torque-transferring gears such that an axis of rotation of said each torque-combining gear member is in substantial perpendicular orientation with substantial co-axial axes of rotation of said first and second final torque-transferring gears, said torque-combining gear members being substantially evenly spaced about said first and second final torque-transferring gears such that each torque-combining gear member is separated from its adjacent torque-combining gear members by approximately one-quarter arc length of the first and second final torque-transferring gears.

10. A transmission as defined in claim 9 wherein each torque-combining gear member is in meshing engagement with its adjacent torque-combining gear members.

11. A transmission as defined in claim 5 wherein the interior teeth of the output annulus are in substantially transverse orientation relative to the interior teeth of the input annulus, such that an axis of rotation of a torque-delivering gear of the at least one dual-gear member is in substantial perpendicular orientation with an axis of rotation of the at least one planetary gear.

12. An automatic transmission for transferring torque from input shaft means to load-varying output shaft means, said transmission comprising:

first and second torque-dividing gears configured for integral attachment to input shaft means to thereby divide torque from said input shaft means into first and second torque components of force, respectively;

a torque-transferring gear set having a first torque-transferring gear in meshing engagement with the first torque-dividing gear, said torque-transferring gear set configured for transferring at least a portion of said first torque component between meshing gears onto a first final torque-transferring gear in meshing engagement with a first side of a torque-combining gear;

at least one dual gear member comprising said torque-combining gear and a torque-delivering gear integrally intercoupled by a shaft;

said torque-combining gear being in simultaneous meshing engagement with (i) the second torque-dividing gear and (ii) the first final torque-transferring gear to thereby combine at least a portion of the first torque component and the second torque component of force into a single torque component, said torque-delivering gear being in meshing engagement with an output gear configured for integral attachment to output shaft means to thereby deliver said single torque component to said output shaft means.

13. A transmission as defined in claim 12 wherein the input shaft means comprises a rigid, elongate input shaft, and wherein said at least a portion of the first torque component and the second torque component are transferred only between gears in meshing engagement.

14. A transmission as defined in claim 13 wherein the first torque-dividing gear comprises an input annulus having interior teeth and being integrally mounted upon the input shaft, and wherein the second torque-dividing gear comprises a second final torque-transferring gear which is integrally mounted upon said input shaft in substantial co-axial orientation with the first torque-dividing gear, the torque-transferring gear set further comprising:

a sun gear rotatably mounted about the input shaft in substantial co-axial orientation therewith such that the interior teeth of the input annulus reside in concentrically spaced orientation about the sun gear;

a set of planetary gears in simultaneous meshing engagement (i) about the sun gear, and (ii) with the interior teeth of the input annulus;

a first final torque-transferring gear comprising a gear fixedly attached to a side of the sun gear, said first final torque-transferring gear being in substantial co-axial orientation with the sun gear, the input shaft, and the second final torque-transferring gear.

15. A transmission as defined in claim 14 wherein the output gear comprises an output annulus having interior teeth, and wherein each planetary gear is rotatably mounted upon a carrier arm which is fixedly attached to an outer rim of the output annulus, to thereby transfer a third torque component from the planetary gears to the output annulus.

16. A transmission as defined in claim 14 wherein the set of planetary gears comprises four planetary gears having substantially equal radii and being substantially evenly spaced around the sun gear such that each planetary gear is separated from its adjacent planetary gears by approximately one-quarter arc length of the sun gear.

17. A transmission as defined in claim 14 wherein the output gear comprises an output annulus having interior teeth and wherein the at least one dual-gear member comprises three dual-gear members, each of the torque-combining gears of the three dual-gear members being in simultaneous meshing engagement with the first and second final torque-transferring gears such that an axis of rotation of said each torque-combining gear is in substantial perpendicular orientation with substantial co-axial axes of rotation of said first and second final torque-transferring gears, said torque-combining gears being substantially evenly spaced about said first and second final torque-transferring gears such that each torque-combining gear is separated from its adjacent torque-combining gears by approximately one-third arc length of the first and second final torque-transferring gears.

18. A transmission as defined in claim 17 wherein the first and second final torque-transferring gears and the three torque-combining gears comprise bevel gears.

19. A transmission as defined in claim 14 wherein the output gear comprises an output annulus having interior teeth and wherein the at least one dual-gear member comprises four dual-gear members, each of the torque-combining gears of the four dual-gear members being in simultaneous meshing engagement with the first and second final torque-transferring gears such that an axis of rotation of said each torque-combining gear is in substantial perpendicular orientation with substantial co-axial axes of rotation of said first and second final torque-transferring gears, said torque-combining gears being substantially evenly spaced about said first and second final torque-transferring gears such that each torque-combining gear is separated from its adjacent torque-combining gears by approximately one-quarter arc length of the first and second final torque-transferring gears.

20. A method for transferring torque from input shaft means to load-varying output shaft means responsive to variation in load on the output shaft means, said method comprising the following steps:

(a) integrally attaching first and second torque-dividing gears to input shaft means to thereby divide torque from said input shaft means into first and second torque components of force, respectively;

(b) meshing a torque-transferring set of gears with the first torque-dividing gear to thereby transfer at least a portion of said first torque component between meshing gears onto a first final torque-transferring gear in meshing engagement with a first side of a torque-combining gear;

(c) selecting at least one dual-gear member having a torque-combining gear and a torque-delivering gear integrally intercoupled by a shaft;

(d) simultaneously meshing the torque-combining gear with the first final torque-transferring gear and the second torque-dividing gear to thereby combine at least a portion of the first torque component and the second torque component into a single torque component of force;

(e) meshing the torque-delivering gear with an output gear; and (f) integrally attaching the output gear to output shaft means to thereby deliver said single torque component to said output shaft means.

* * * * *